United States Patent
Posch et al.

Patent Number: 5,528,554
Date of Patent: Jun. 18, 1996

[54] LINEAR ARRAY LATERAL MOTION COMPENSATION METHOD

[75] Inventors: Theodore E. Posch, Fullerton; Bernard J. Repasky, La Habra, both of Calif.; Ben R. Breed, Austin, Tex.

[73] Assignee: Hughes Aircraft Company, Los Angeles, Calif.

[21] Appl. No.: 39,600

[22] Filed: Mar. 22, 1993

Related U.S. Application Data

[63] Continuation-in-part of Ser. No. 984,025, Dec. 1, 1992, abandoned.

[51] Int. Cl.$^6$ .......................... H04B 17/00; G01S 15/00
[52] U.S. Cl. ........................ 367/12; 367/106; 367/130
[58] Field of Search ............................. 367/12, 13, 19, 367/22, 106, 130, 138

[56] References Cited

U.S. PATENT DOCUMENTS

| | | | |
|---|---|---|---|
| 4,454,597 | 6/1984 | Sullivan | 367/13 |
| 5,117,400 | 5/1992 | Penn et al. | 367/13 |

*Primary Examiner*—Daniel T. Pihulic
*Attorney, Agent, or Firm*—W. K. Denson-Low

[57] ABSTRACT

A method for compensating for lateral distortion in a moving linear array using a frequency domain beamformer, comprising the steps of measuring the instantaneous lateral distortion of the linear array at discrete points along the array, corresponding to array element locations, calculating a shading weight for each of the discrete points along the array, corresponding to array element locations based on the instantaneous lateral distortion at each said point and calculating the compensated beam magnitude by multiplying said shading weight into the frequency domain beamformer equation.

1 Claim, 1 Drawing Sheet

LINEAR ARRAY LATERAL MOTION COMPENSATION METHOD

This invention was made with Government support under Contract No. N00039-85-C-0096 awarded by the Department of the Navy. The Government has certain rights in this invention.

This application is a continuation-in-part of application Ser. No. 07/984,025 filed on Dec. 1, 1992, now abandoned.

BACKGROUND OF THE INVENTION

1. Field of the Invention

This invention relates generally to sensor signal processing, and more particularly to the field of array motion compensation. A particular use of the invention is in movable linear arrays which are subject to lateral distortion.

2. Prior Art

A linear array is a linear distribution of sensors, or other type of emitting/receiving device, in which there are a multitude of receiving/radiating elements, each arranged in a straight line. When the received or emitted signal is represented in frequency domain and properly phased or time delayed for arrivals from or emissions to a particular direction, the resulting interference produces a maximum response in that direction. This maximum response is called a beam in that direction. Beams may be formed in multiple directions simultaneously by a process known as a beamformer. The linear array can be designed to operate either actively or passively.

The direction and intensity of the beams is determined by the beamformer which controls the output of the beams in either the time domain or the frequency domain. A time domain beamformer inserts a time delay into the signal from/to each radiating element. A frequency domain beamformer shifts the phase of the signal from/to each radiating element. Frequency domain beamformers are gaining in acceptance in the art due to the increased abundance and speed of Fast Fourier Transform (FFT) electronic devices.

An interference pattern is created by the intersection of the modulated signal from each of the radiating elements, and these lines of interference are the antenna beams.

A fixed linear array can achieve a high degree of beam pointing accuracy, because there is no lateral distortion of the array. However, when the array is in motion, the linear symmetry or shape of the array is distorted and the beam pointing accuracy significantly diminishes. A towed SONAR array is an example of a moving linear array. In a towed SONAR array, receiving elements are strung linearly along the length of a cable, which is towed behind a ship. An array can generate a very high number of beams, each projecting outward from the array. A towed linear array operating passively is extremely useful, as the beams can simultaneously identify and localize numerous ocean targets, such as enemy ships or submarines, in various positions relative to the tow ship, without giving away the tow ship location.

A significant problem with towed arrays is the difficulty in maintaining the linear symmetry of the array. As the cable moves through the water, the ocean currents and the even velocity and steering of the tow ship causes distortions in the shape of the array. These distortions diminish the accuracy and utility of the towed array, because the actual beam pointing direction is different from the calculated direction. There currently exists no method of compensating for this distortion, and the reduction in accuracy is generally accepted as a condition of the device.

It would be highly desirable to develop a method for compensating for the lateral motion of a linear array using a frequency domain beamformer. The present invention was developed to address this need.

SUMMARY OF THE INVENTION

Figure 1:
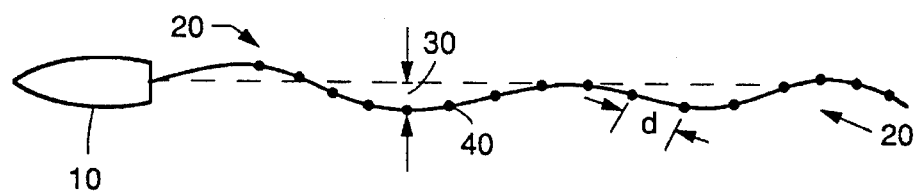
FIG. 1 shows a towed linear array with lateral distortion.

The present invention provides for a method for compensating for lateral distortion in a linear array. A linear array is a sensing device in which multiple receiving or transmitting elements are arranged in a straight line. Multiple beams are formed by the linear array and each beam focuses in a predetermined direction. Lateral motion of the array distorts the array shape and consequently alters the beam pointing direction. This method results in improved beam pointing accuracy in linear arrays over uncompensated arrays.

The invention is advantageously used in linear arrays such as used in towed SONAR arrays. Towed SONAR arrays are commonly used by Navy ships to localize distant enemy targets. A significant problem with towed SONAR arrays is that the wave motion and uneven tow ship steering and velocity distorts the shape of the towed linear array, thus reducing the accuracy of the array. By use of the invention, the instantaneous variations in array shape are compensated for, significantly improving the utility of the arrays.

Briefly, and in general terms, the method for distortion compensation according to the present invention includes a means for measuring the magnitude of the instantaneous distortion in the array; the calculation of element shading weights based on the distortion magnitudes by the use of an algorithm; and the compensation of individual beam magnitudes by using the shading weights in the control of the arrays.

In common usage within the art, linear arrays are controlled by frequency domain beamformers. These frequency domain beamformers utilize algorithmic methods to control beam magnitude and direction. A major advantage of the invention is that the shading weights calculated are simply multiplied into the frequency domain beamformer equation. Therefore, the array distortion can be compensated for without a significant deviation in current linear array design.

From the above, it may be seen that the present invention has important advantages related to linear array lateral motion compensation, and particularly to towed SONAR array motion compensation. Other aspects and advantages of the invention will become apparent from the following detailed description and the accompanying drawings, which illustrate by way of example the features of the invention.

DETAILED DESCRIPTION OF THE INVENTION

As shown in the drawings, which are included for the purpose of illustration, the invention is embodied in a method to compensate a linear array for the effects of lateral distortion. A linear array is an antenna, or other type of receiving device, in which there are multitude of receiving elements arranged in a straight line. The array can generate a multitude of beams for the purpose of localizing distant targets. Lateral distortion occurs when the linear symmetry of the array is altered by outside forces and results in an overall reduction in array pointing accuracy.

A common use of a linear array is in the field of towed SONAR arrays. In a towed SONAR array, a Navy ship drags a lengthy cable through the water. The cable has a multitude of receiving elements or transponders positioned at even increments along its length.

A frequency domain beamformer is used to convert all the transponder signals into coherent localization information. The phase of the signal information from each transponder is shifted by varying degrees, and all the signal information is summed by Fast Fourier Transform (FFT). This summation results in individual beams of signal energy in a known angle relative to the direction of the array. The precise localization of the target can be determined from the intersection of the beams.

A significant problem with towed SONAR arrays is the distortion of the shape of the array, which decreases its pointing accuracy. As the cable moves through the water, ocean currents and tow ship steering and velocity variations cause ripples in the array; instead of remaining in a perfectly straight line, the cable bends and curves. FIG. 1 shows a distorted array. The tow ship 10 pulls a linear array cable 20, which has been substantially distorted 30. With the array distorted, the actual pointing direction varies by several degrees from the expected direction and incorrect target localization would be obtained.

The invention utilizes an algorithmic method to determine a shading weight to be applied to the signal from each transducer. The shading weight attenuates the magnitude of the beams, thus correcting for distortion. To further describe the details of the invention, the mathematical derivation of the algorithm will be illustrated.

Figure 2:
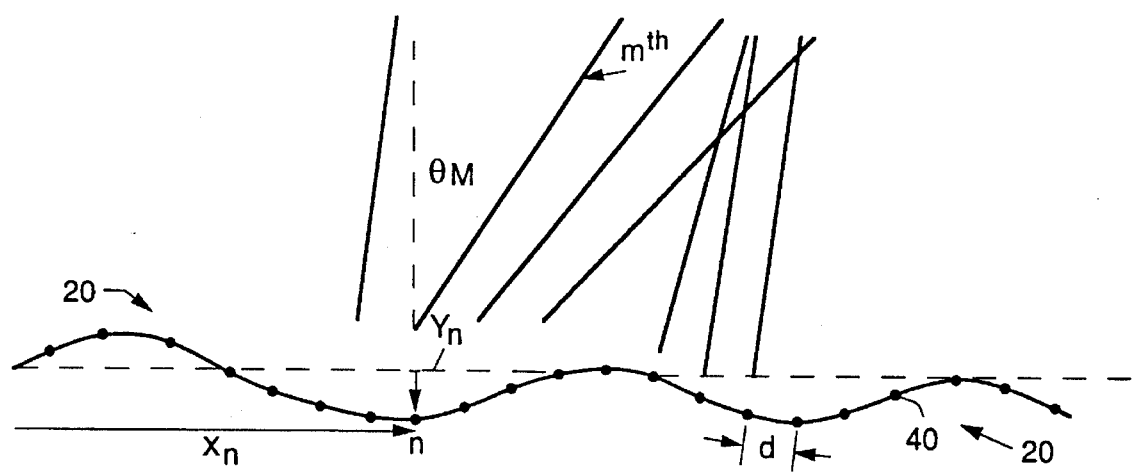
FIG. 2 shows an array utilizing compensation of the present invention.

In an embodiment of the invention (FIG. 2), an array would be equipped with N transducers, each spaced a distance d apart. The ship travels in the X-axis direction, such that the linear coordinate of a specific transducer n is $X_n$. The array displacement direction is perpendicular to the array, and in the Y-axis such that the magnitude of transponder displacement is $Y_n$. In perfect conditions, with no lateral displacement, $Y_n$ is equal to zero.

The array forms m beams, and each beam points in the direction $\theta_m$, relative to broadside. Therefore, the magnitude of the $m^{th}$ beam for a steering direction $\theta_m$ is described by the equation $$X_m = \sum_{n=0}^{N-1} a_n S_n(t) e^{-2\pi j(f/c)(X_n \sin\theta_m + Y_n \cos\theta_m)} \quad (1)$$

where $S_n(t)$ is the signal on the $n^{th}$ element at time t; $a_n$ is a shading constant for calibration of the transducers; f is the frequency of the signal $S_n(t)$; and c is the speed of the propagated signal. In a towed SONAR array, c is the speed of sound in water.

In an undistorted array, the $Y_n$ coordinate is zero and the magnitude of the $m^{th}$ beam for a steering direction $\theta_m$ is described as $$X_m = \sum_{n=0}^{N-1} a_n S_n(t) e^{-2\pi j(f/c)(X_n \sin\theta_m)} \quad (2)$$

Equation (2) is the Frequency Domain Beamformer equation as commonly used in the art. The equation can be solved using a Fast Fourier Transform (FFT) to determine array beam magnitude.

From equation (1), the missing component for the Y-displacement can be recalculated as the new shading weight $b_n$, such that $$b_n(\theta_m) = a_n e^{-2\pi j Y_n(f/c)\cos\theta_m} \quad (3)$$

and $$X_m = \sum_{n=0}^{n-1} b_n(\theta_m) S_n(t) e^{-2\pi j(f/c)(X_n \sin\theta_m)} \quad (4)$$

Equation (4) replaces equation (2) as the Frequency Domain Beamformer equation. It too can be readily solved using an FFT. Therefore, by multiplying the shading weight in the frequency Domain Beamformer equation, the resulting beam magnitude values will be compensated for lateral distortion.

The values for the lateral distortion, $Y_n$ can be measured directly from the array. Heading sensors mounted adjacent to the transponders will track array movement through the water, and provide instantaneous position information by sampling the set of heading sensors. These array distortion figures are then input into the shading weight calculated in equation (3).

The invention comprises three discrete steps. The first step is the sampling of the heading sensors to obtain array distortion data, $Y_n$. Next, the shading weight, $b_n$, is calculated for each transducer position. Lastly, the shading weight is combined in the Frequency Domain Beamformer equation to correct the resulting phase value to compensate for the distortion. The resulting calibrated beam magnitude values yield more accurate results when used to localize distant targets.

Computer simulation of distorted linear arrays has been performed to characterize the improvements in accuracy by use of the invention. The simulation involved a half-cycle cosine shaped array with twenty displacement measurements. An uncompensated array was compared to one compensated by the invention. The test results revealed significant improvement in localization accuracy of simulated distant targets over the uncompensated array.

Those skilled in the art will appreciate from the foregoing description that the present invention for compensation of a linear array for lateral distortion can achieve a significant improvement in pointing accuracy over uncompensated linear arrays. A significant advantage of the invention is that accurate array information can be obtained despite substantial distortion in array shape, while undertaking only modest changes to current design. While a particular form of the invention has been described, it will be apparent that various modifications can be made without departing from the spirit and scope of the invention.

What is claimed is:

1. A method for compensating for lateral distortion in a moving linear array using a frequency domain beamformer, comprising the steps of:

measuring the instantaneous lateral distortion of a linear array, $Y_n$, at discrete points along the array, corresponding to array element locations;

calculating a shading weight, $b_n$, for each of the discrete points along the array, corresponding to array element locations, according to the algorithm $$b_n(\theta_m) = a_n e^{-2\pi j Y_n(f/c)\cos\theta_m}$$

where $a_n$ is the element shading constant, f is the frequency of the propagated signal, c is the speed of the propagated signal, and $\theta_m$ is the beam pointing direction relative to broadside;

calculating the compensated beam magnitude $X_m$, by multiplying said shading weight into the frequency domain beamformer equation, according to the algorithm $$X_m = \sum_{n=0}^{N-1} b_n(\theta_m) S_n(t) e^{-2\pi j (f/c)(X_n \sin\theta_m)}$$

where N is the total number of elements in the array, $S_n(t)$ is the signal on the $n^{th}$ element of the array, n is the element number, and m is the beam number.

* * * * *